United States Patent
Browne et al.

(10) Patent No.: US 7,661,045 B2
(45) Date of Patent: Feb. 9, 2010

(54) METHOD AND SYSTEM FOR ENTERPRISE MEMORY MANAGEMENT OF MEMORY MODULES

(75) Inventors: Michael E. Browne, Staatsburg, NY (US); Trevor E. Carlson, Bethpage, NY (US); Stephanie A. Schaum, Poughkeepsie, NY (US); Ashwin S. Venkatraman, Poughkeepsie, NY (US); Maria R. Ward, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 11/960,179

(22) Filed: Dec. 19, 2007

(65) Prior Publication Data
US 2009/0164842 A1 Jun. 25, 2009

(51) Int. Cl.
G11C 29/00 (2006.01)
G06F 11/00 (2006.01)

(52) U.S. Cl. .......................... 714/723; 714/47; 714/764
(58) Field of Classification Search .................. 714/723
See application file for complete search history.

(56) References Cited

U.S. PATENT DOCUMENTS

| | | | | |
|---|---|---|---|---|
| 4,964,130 | A * | 10/1990 | Bowden et al. | 714/764 |
| 5,263,032 | A | 11/1993 | Porter et al. | |
| 6,216,169 | B1 * | 4/2001 | Booman et al. | 709/246 |
| 6,279,128 | B1 | 8/2001 | Arnold et al. | |
| 6,480,982 | B1 * | 11/2002 | Chan et al. | 714/764 |
| 6,560,725 | B1 | 5/2003 | Longwell et al. | |
| 7,058,782 | B2 | 6/2006 | Henderson et al. | |
| 7,100,004 | B2 | 8/2006 | Chen Johnson et al. | |
| 2003/0097608 | A1 | 5/2003 | Rodeheffer et al. | |
| 2003/0135794 | A1 * | 7/2003 | Longwell et al. | 714/42 |
| 2006/0212778 | A1 | 9/2006 | Wheeler et al. | |
| 2007/0022244 | A1 | 1/2007 | Kimmery | |
| 2007/0050667 | A1 * | 3/2007 | Zohar et al. | 714/6 |
| 2007/0101238 | A1 | 5/2007 | Resnick et al. | |
| 2008/0301530 | A1 * | 12/2008 | Spanel et al. | 714/765 |
| 2009/0125788 | A1 * | 5/2009 | Wheeler et al. | 714/764 |

* cited by examiner

*Primary Examiner*—Kevin L Ellis
*Assistant Examiner*—Ebrahim Golabbakhsh
(74) *Attorney, Agent, or Firm*—Cantor Colburn LLP; Steven Chiu

(57) ABSTRACT

A method and system for enterprise memory management of memory modules of a computer system. The method includes scanning memory chips of a memory module for errors, analyzing a scrub error map corresponding to a scrubbing operation of the memory module, generating a scrub map summary based upon the scrub error map analyzed, creating an error history map by adding the scrub map summary generated, analyzing the error history map created and tracking a chip location for each memory chip of the memory module including errors, and determining a scrubbing algorithm of the memory module based on the analyzed error history map. The enterprise memory management system includes a plurality of computers each including memory modules, and an enterprise memory manager which collects and analyzes error history maps corresponding to each computer and determines a scrubbing algorithm of the memory modules of each computer.

20 Claims, 5 Drawing Sheets

Error History Map

| Memory address | Historical Error count | Chip # | DIMM # |
|---|---|---|---|
| 0000001 | 1 | 1 | 4 |
| ○ | ○ | ○ | ○ |
| ○ | ○ | ○ | ○ |
| 0000045 | 3 | 1 | 4 |
| 0000001 | 0 | 2 | 5 |
| 0000062 | 12 | 3 | 5 |

METHOD AND SYSTEM FOR ENTERPRISE MEMORY MANAGEMENT OF MEMORY MODULES

CROSS-REFERENCE TO RELATED APPLICATIONS

This application contains subject matter which is related to the subject matter of the following co-pending application, which is assigned to the same assignee as this application, International Business Machines Corporation of Armonk, N.Y. The below listed application is hereby incorporated herein by reference in its entirety: The Application entitled "Method for Scrubbing Storage in a Computer Memory", patent application Ser. No. 11/959,727 by Browne et al. and filed on Dec. 19, 2007.

BACKGROUND OF THE INVENTION

1. Field of the Invention

This invention relates to method and system for enterprise memory management of memory modules, and particularly to a memory scrubbing prioritization method and system which enables the selection of a scrubbing algorithm to be used in future memory scrubbing operations of memory modules, based upon stored historical error data corresponding to previous scrubbing operations performed on the memory modules.

2. Description of Background

In memory modules such as dual-in-line memory modules (DIMMs) used in computer systems, memory data and keys are periodically scrubbed to correct soft errors, i.e., correctable errors (CEs) before they develop into hard errors, i.e., uncorrectable errors (UEs). Conventionally, each memory card is fully scrubbed in turn, sequentially, one at a time. The conventional memory scrubbing method employs an error summary map for each scrubbing operation of the memory card. The error summary map is a summary of errors found in each memory chip of a memory module. Since an error summary map is created for each scrubbing operation, this creates the problem that historical data is not collected to assist with future scrubbing operations of the memory module.

SUMMARY OF THE INVENTION

The shortcomings of the prior art are overcome and additional advantages are provided through the provision of an enterprise memory management method for scrubbing a memory module in a computer system which includes scanning memory chips of the memory module for errors, analyzing a scrub error map corresponding to a scrubbing operation of the memory module, generating a scrub map summary based upon the scrub error map analyzed, creating an error history map by adding the scrub map summary generated, analyzing the error history map created and tracking a chip location for each memory chip of the memory module which includes errors, and determining a scrubbing algorithm of the memory module based on the analyzed error history map.

A further aspect of the present invention relates to an enterprise memory management method for scrubbing a plurality of memory modules in a computer system which includes scanning each memory module for errors, analyzing a scrub error map corresponding to a scrubbing operation of each memory modules, generating a scrub map summary based upon each scrub error map analyzed, creating an error history map by adding each scrub map summary generated, analyzing the error history map created, to track a chip location for each memory chip of a respective memory module which includes errors, and determining a scrubbing algorithm of the memory modules based on the analyzed error history map.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

Embodiments of the present invention create an error history map (i.e., an historical error-to-chip location map corresponding to a plurality of memory modules), which is the basis for selecting a scrubbing algorithm (i.e., a search geometry to be used in future scrubbing operations of the memory modules).

As a result of the summarized invention, technically we have achieved a solution which speeds up scanning of memory modules by observing patterns in the scrubbing history thereof, and enables a technician to locate and perform maintenance of the memory modules more efficiently.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
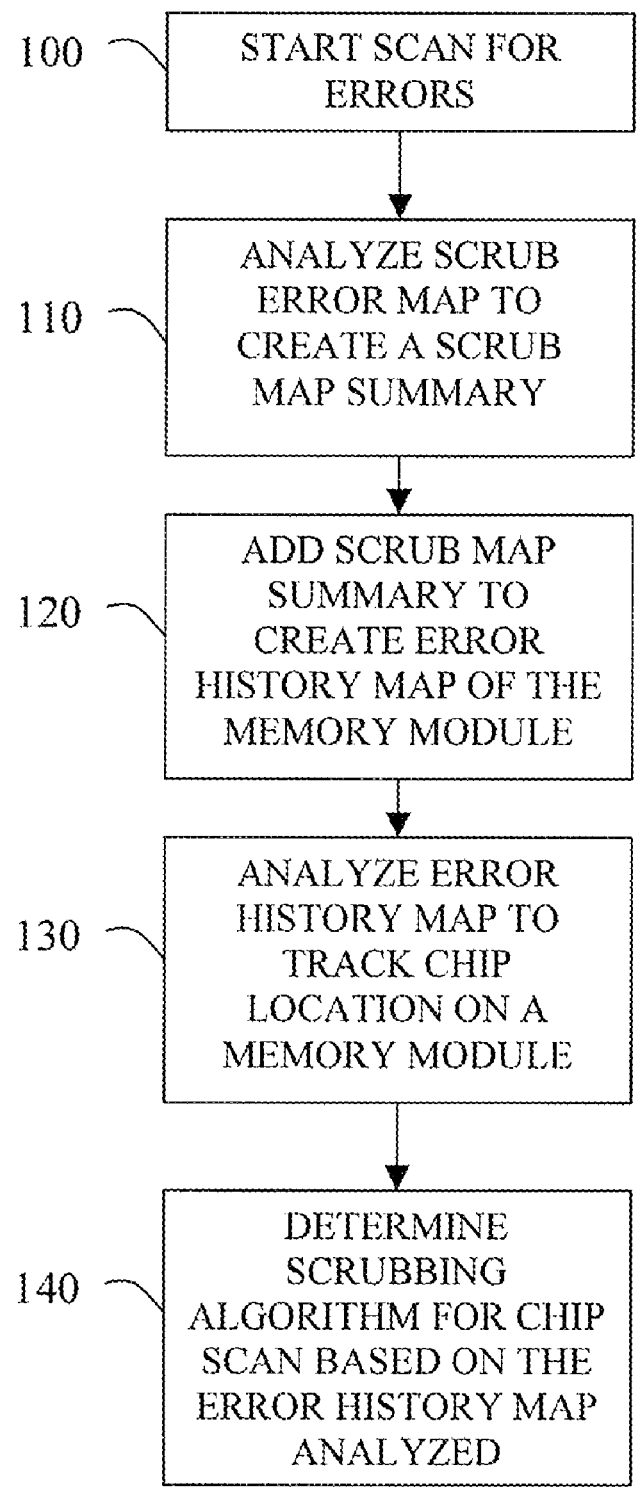
FIG. 1 is a flow chart detailing aspects of a scanning method that can be implemented within aspects of the present invention.

Turning now to the drawings in greater detail, it will be seen that in FIG. 1 there is an enterprise memory management method for scrubbing a memory module in a computer system. As shown in FIG. 1, at operation 100, memory chips of a memory module in a computer system are scanned for errors. From operation 100, the process moves to operation 110, where a current scrub error map corresponding to errors found during a scrubbing operation of the memory module is analyzed and a scrub map summary is generated based upon the scrub error map analyzed. According to an embodiment of the present invention, the scrub map summary is generated based upon a predetermined number of scrub error maps corresponding to a predetermined number of scrubbing operations performed on the memory module over a specified time period. That is, the scrub map summary may include a series of scrub error maps corresponding to scrubbing operations performed on the memory module over, for example, a six-month period. The present invention is not limited to any specified time period and may vary as necessary. Alternatively, according to another embodiment of the present invention, the scrub map summary is generated based upon a most previous scrub error map corresponding to a scrubbing operation of the memory module.

Further, as shown in FIG. 1, from operation 110 the process moves to operation 120, where an error history map (see FIG. 2) of the memory module is created by adding the scrub map summary generated. The error history map includes historical error-to-chip location information and is used to determine the frequency of errors in certain chip locations of the memory module over a predetermined time period.

From operation 120, the process moves to operation 130, where the error history map created is then analyzed and a chip location for each memory chip of the memory module which includes errors is tracked. Then, from operation 130, the process moves to operation 140, where a scrubbing algorithm (i.e., a search geometry of the memory module) is determined based on the analyzed error history map. According to an embodiment of the present invention, a scrubbing algorithm includes an order and frequency in which to perform scrubbing of each memory chip of the memory module is determined based upon the number of errors found in each memory chip during scrubbing operations of the memory module. For example, if the memory module includes memory chips having errors, those memory chips may be scanned before the memory chips which do not include errors.

Figure 2:
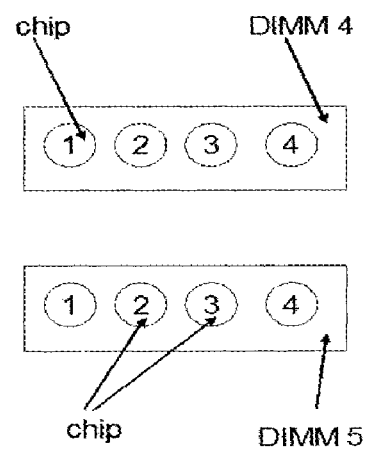
FIG. 2 illustrates a schematic diagram illustrating one example of an error history map of a plurality of memory modules that can be implemented within embodiments of the present invention.

FIG. 2 illustrates a schematic diagram illustrating one example of an error history map of memory modules that can be implemented within embodiments of the present invention.

FIG. 2 illustrates an error history map 10 of a computer system. According to an embodiment of the present invention, the error history map 10 comprises historical error-to-chip data corresponding to each memory chip of a plurality of memory modules. For example, FIG. 2 illustrates a plurality of memory modules, e.g., DIMM 1, DIMM 2, DIMM 3, DIMM 4 and DIMM 5, each comprising a plurality of memory chips 1 through 4. The present invention is not limited in any particular type or number of memory modules, and may vary as necessary.

When scanning DIMMs 1 through 5, scrub summary maps are generated and added to create the error history map 10. Each scrub summary map includes a summary of all errors found in each memory module DIMM 1 through 5. For purpose of illustration, as shown in FIG. 2, the error history map 10 shows that memory chip 1 of DIMM 4 includes one error at memory address 0000001 and three errors at memory address 0000045. Also, the error history map 10 shows that memory chip 2 of DIMM 5 does not have any errors at memory address 0000001 while memory chip 3 of DIMM 5 includes 12 errors at memory address 0000062.

The error history map 10 is used to determine the frequency of errors in certain memory chip locations of a memory module over a specified time period. According to an embodiment, the error history map 10 is dynamically generated while performing a scrubbing operation of the memory module.

The present invention is not limited to the error history map 10 being a map. Alternatively, the historical error-to-chip data as shown in the error history map 10 in FIG. 2 may be collected in a register, memory disk, tape or any computer-readable medium. Further, according to an embodiment, the error history map 10 may be stored in a separate storage location on the computer system and the contents thereof are dynamically updated during scrubbing operations of the memory modules DIMMs 1 through 5.

Figure 3:
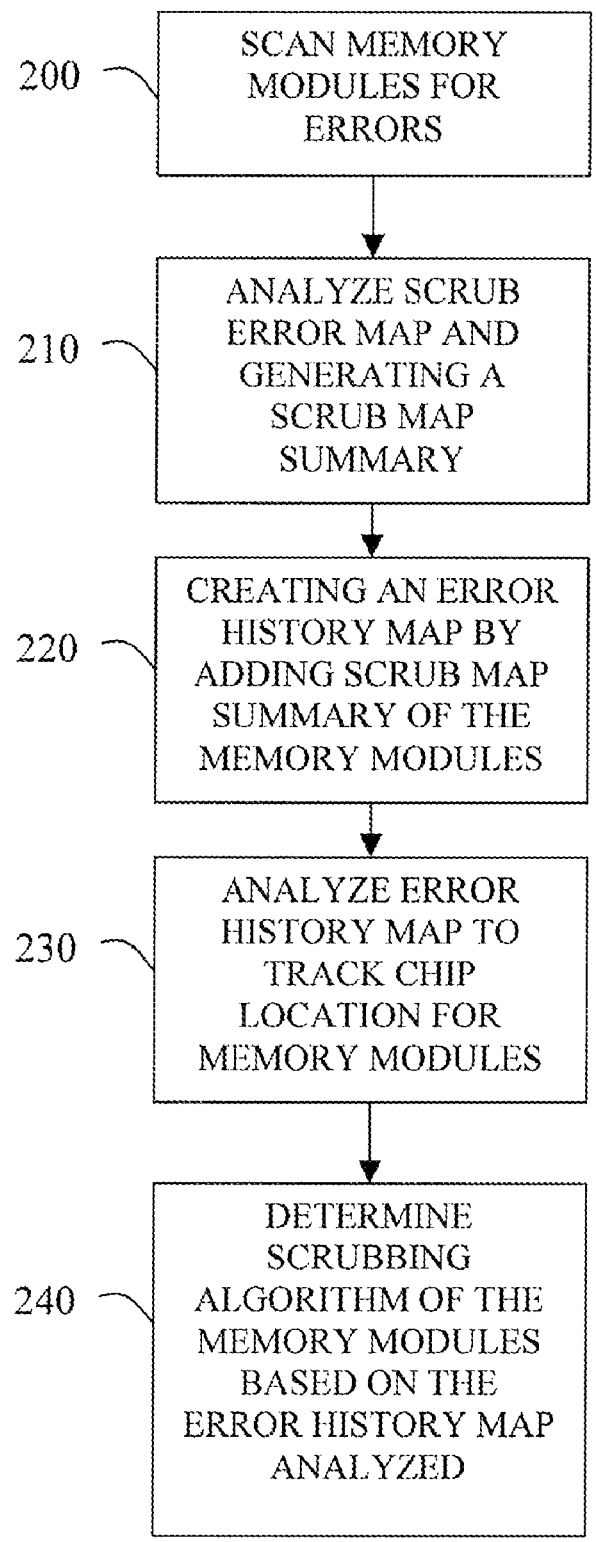
FIG. 3 illustrates a flow chart detailing aspects of another scanning method that can be implemented within aspects of the present invention with reference to FIG. 2.

FIG. 3 illustrates a flow chart detailing aspects of another scanning method that can be implemented within aspects of the present invention with reference to FIG. 2.

FIG. 3 illustrates an enterprise memory management method for scrubbing a plurality of memory modules DIMMs 1 through 5 in a computer system. At operation 200, each memory module DIMMs 1 through 5 is scanned for errors. From operation 200, the process moves to operation 210, where a scrub error map corresponding to a scrubbing operation of each memory modules DIMMs 1 through 5 is analyzed and a scrub map summary is generated based upon each scrub error map analyzed. At operation 220, the scrub map summaries are added to create an error history map 10 (see FIG. 2). At operation 230, the error history map 10 created is analyzed in order to track a chip location for each memory chip 1-4 of a respective memory module DIMM 1 through 5, which includes errors. From operation 230, the process moves to operation 240, where a scrubbing algorithm i.e., an order and/or frequency in which to perform scrubbing operations of the memory modules DIMMs 1 through 5 is determined based on the analyzed error history map 10. Referring to FIG. 2, for example, since memory chip 3 of DIMM 5 includes 12 errors, instead of sequentially scanning DIMMs 1 through 5 in order, a scrubbing algorithm of DIMMs 1 through 5 is changed to scan DIMM 5 first, so that DIMM 5 can be located, and correctable errors can be corrected or DIMM 5 can be replaced more quickly.

According to another embodiment of the present invention, the error history map 10 includes DIMM replacement information which comprises information corresponding to the replacement of any of DIMMs 1 through 5.

According to an embodiment of the present invention, a new scrub map summary is generated when a memory module DIMM 1 through 5 is replaced with another memory module and the error history map 10 is re-generated based on the new memory module added.

According to an embodiment of the present invention, it is also determined whether a scrubbing operation of a memory module may be skipped based upon information corresponding to the respective memory module DIMM 1 through 5 in the error history map 10. For example, if no errors were found in DIMM 4 during the last 10 scrubbing operations performed, then DIMM 4 may be skipped during scrubbing of the memory modules, or scrubbed less frequently in order to shorten the total scrubbing time. Alternatively, if historically, errors have been found in DIMM 4 repeatedly during the last 10 scrubbing operations performed, for example, then DIMM 4 will be scrubbed first and/or more often than the other DIMMs 1, 2, 3 and 5.

Additional embodiments of the present invention will now be described with reference to FIGS. 4 and 5.

Figure 4:
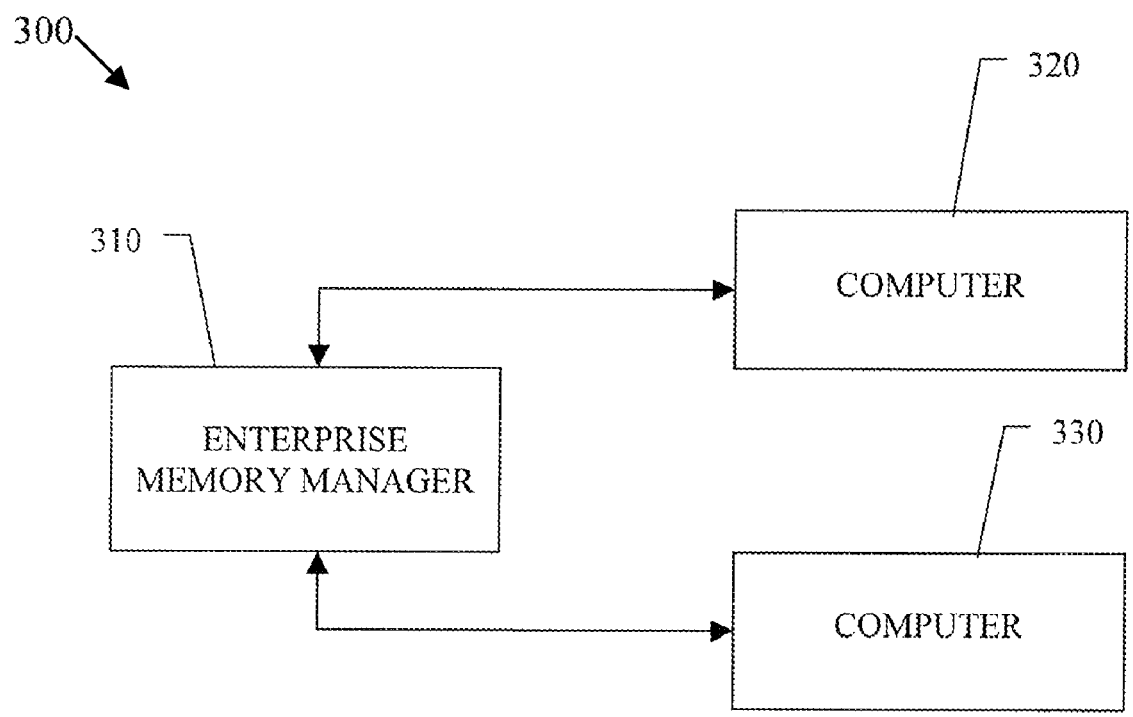
FIG. 4 is a schematic diagram illustrating one example of an Enterprise Memory Management system that can be implemented within embodiments of the present invention.

FIG. 4 is a schematic diagram illustrating one example of an Enterprise Memory Management system that can be implemented within embodiments of the present invention. As shown in FIG. 4, the enterprise memory management system 300 comprises an enterprise memory manager 310 and a plurality of computers 320 and 330. The present invention is not limited to any particular number of computers and may vary, accordingly. Each computer 320 and 330 comprises a plurality of memory modules which store data. The memory modules are periodically scrubbed for errors and error-to-chip information of the memory modules is collected to create an error history map 10 as shown in FIG. 2, for example, for each computer 320 and 330.

The enterprise memory manager 310 communicates with the plurality of computers 320 and 330 and collects the error history map 10 from each of the computers 320 and 330 in real-time, and analyzes the error history maps 10 and forwards analysis results to the computers 320 and 330, respectively. According to an embodiment of the present invention, when the enterprise memory manager 310 analyzes the error history maps 10 from each computer 320 and 330, the enterprise memory manager 310 determines a scrubbing algorithm of the memory modules of each computer 320 and 330. That is, the enterprise memory module determines an order and frequency in which a scrubbing operation of the memory modules should be performed, and when replacement of the memory modules may be necessary, and forwards the determination results to computers 320 and 330, respectively. Thus, in the current embodiment, the computers 320 and 330 indirectly communicate with each other. The enterprise memory manager 310 shares information concerning specified memory modules with both computers 320 and 330. For example, if the computer 320 comprises a DIMM having a history of errors and computer 330 includes a DIMM having the same serial number as that of the DIMM in computer 320, then the enterprise memory manager 310 will inform computer 330 that it is necessary to scrub that particular DIMM more frequently based on the error information in the error history map from computer 320 analyzed by the enterprise memory manager 310.

The enterprise memory manager 310 stores identification information corresponding to each memory module of each computer 320 and 330. According to an embodiment of the present invention, the identification information comprises at least one of a part number, a serial number, a field replacement unit (FRU) number, and location information for each memory module of the respective computers 320 and 330.

According to the current embodiment of the present invention, as shown in FIG. 4, for example, the enterprise memory manager 310 is a separate computer, which is externally connected to each of the computers 320 and 330. However, the present invention is not limited hereto and may vary accordingly.

Figure 5:
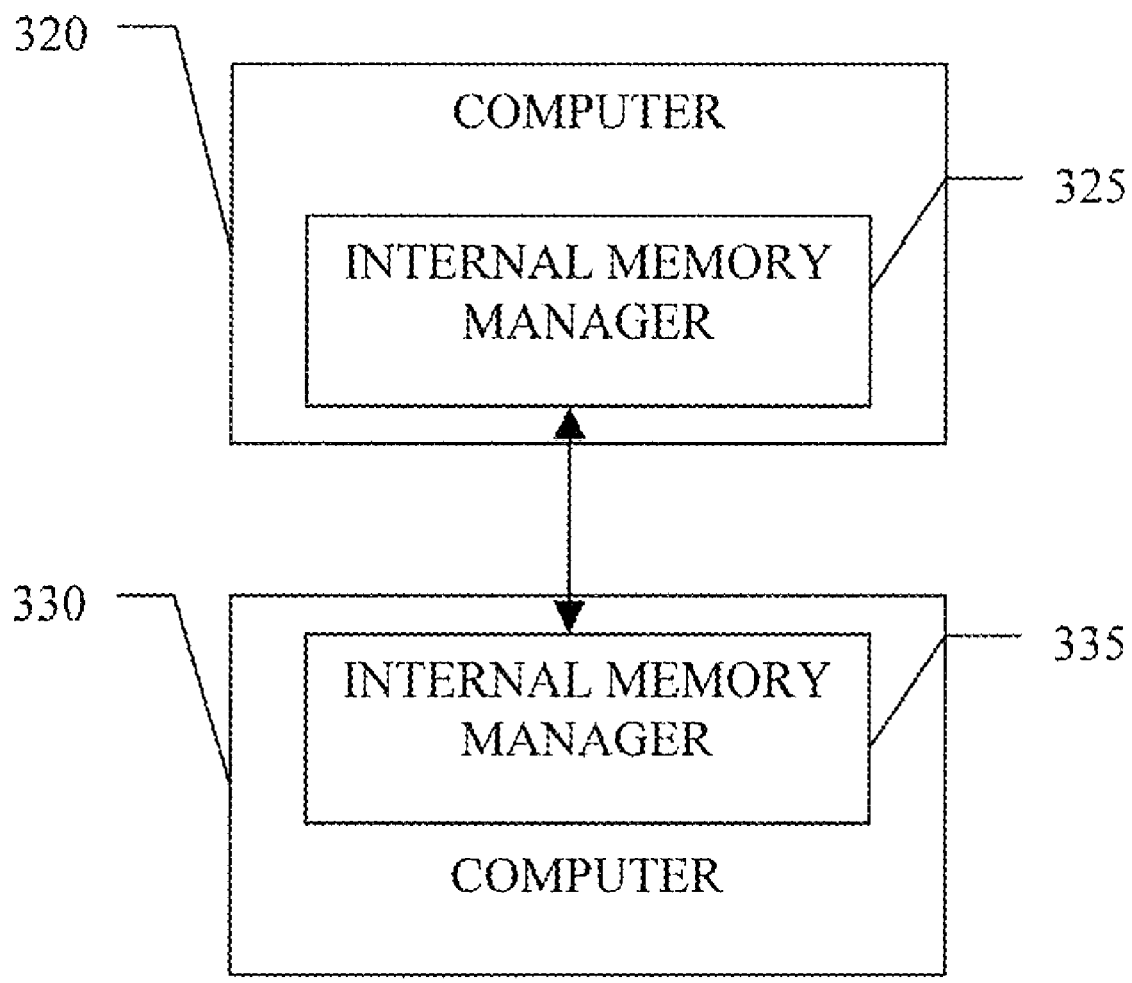
FIG. 5 is a schematic diagram illustrating another example of an Enterprise Memory Management system that can be implemented within embodiments of the present invention.

FIG. 5 is a schematic diagram illustrating another example of an Enterprise Memory Management system that can be implemented within embodiments of the present invention.

As shown in FIG. 5, the enterprise memory manager 110 comprises a plurality of internal enterprise memory managers 325 and 335 each included in the computers 320 and 330, the internal enterprise memory managers 325 and 335 of the computers 320 and 330 communicate with each other and exchange error history map information corresponding to their respective error history maps 10. The computers 320 and 330 are able to determine a scrubbing algorithm of their respective memory modules based upon the exchanged error history map information.

According to an embodiment of the present invention, the computers 320 and 330 compare high value error information in order to determine a scrubbing algorithm of their respective memory modules. For example, if the error history map 10 of computer 320 shows that DIMM 5 having a specified model number "0027" had 6 correctable errors in April and a DIMM having the same model number in computer 330 had 27 correctable errors during May, then computers 320 and 330 may conclude that all DIMMs having that same model number "0027" are defective memory modules, and may determine that replacement of these DIMMs is necessary.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An enterprise memory management method for scrubbing a memory module in a computer system, the method comprising:

scanning memory chips of the memory module for errors during a scrubbing operation of the memory module;

analyzing a scrub error map corresponding to any errors found during the scrubbing operation of the memory module;

generating a scrub map summary based upon the scrub error map analyzed;

creating an error history map by adding the scrub map summary generated;

analyzing the error history map created and tracking a chip location for each memory chip of the memory module including errors; and determining a scrubbing algorithm of the memory module based on the analyzed error history map.

2. The method of claim 1, further comprising:

dynamically updating contents of the error history map while performing a scrubbing operation of the memory module.

3. The method of claim 1, further comprising:

generating another scrub map summary when the memory module is replaced with another memory module and re-generating the error history map based on the other memory module.

4. The method of claim 1, further comprising:

analyzing the error history map created and skipping a scrubbing operation of a memory module based upon information corresponding to the memory module in the error history map.

5. The method of claim 1, wherein generating a scrub map summary based upon each scrub error map analyzed comprises:

generating the scrub map summary based upon a predetermined number of scrub error maps corresponding to a predetermined number of scrubbing operations performed on the memory module over a specified time period.

6. The method of claim 1, wherein generating a scrub map summary based upon each scrub error map comprises:
generating the scrub map summary based upon a most previous scrub error map corresponding to a scrubbing operation of the memory module.

7. The method of claim 1, further comprising:
dynamically generating a error history map while performing a scrubbing operation of the memory module.

8. An enterprise memory management method for scrubbing a plurality of memory modules in a computer system, the method comprising:
scanning each memory module for errors during a scrubbing operation of each memory module;
analyzing a scrub error map corresponding to any errors found during the scrubbing operation of each memory module;
generating a scrub map summary based upon each scrub error map analyzed;
creating an error history map by adding each scrub map summary generated;
analyzing the error history map created, to track a chip location for each memory chip of a respective memory module having errors; and
determining a scrubbing algorithm of the memory modules based on the analyzed error history map.

9. An enterprise memory management system for memory modules of a computer system, the enterprise memory management system comprising:
a plurality of computers each comprising a plurality of memory modules which store data, the memory modules are scrubbed for errors and error-to-chip location information of the memory modules is collected to create an error history map for each computer; and
a enterprise memory manager which communicates with and monitors the plurality of computers, collects the error history map from each of the computers, analyzes the error history maps, and determines a scrubbing algorithm for the memory modules of each computer and forwards the scrubbing algorithm to the computers, respectively.

10. The enterprise memory management system of claim 9, wherein the scrubbing algorithm comprises an order and frequency in which to perform scrubbing operations of the memory modules of each computer.

11. The enterprise memory management system of claim 9, wherein the enterprise memory manager stores identification information corresponding to each memory module of each computer.

12. The enterprise memory management system of claim 11, wherein the identification information comprises at least one of a part number, a serial number, a field replacement unit number, and location information for each memory module.

13. The enterprise memory management system of claim 9, wherein the enterprise memory manager is a computer, which is externally connected to each of the computers.

14. The enterprise memory management system of claim 9, wherein the enterprise memory manager comprises:
a plurality of internal enterprise memory managers each included in the computers, the internal enterprise memory managers of the computers communicating with each other and exchanging error history map information corresponding to the error history maps, and determining when to perform a scrubbing operation of their respective memory modules, and when to replace their respective memory modules, based upon the exchanged error history map information.

15. The enterprise memory management system of claim 14, wherein the computers compare high value error information in order to determine a scrubbing algorithm of their respective memory modules.

16. A computer program product comprising a computer useable medium including a computer readable program, wherein the computer readable program when executed on a computer causes the computer to implement a method, the method comprising:
scanning memory chips of the memory module for errors during a scrubbing operation of the memory module;
analyzing a scrub error map corresponding to any errors found during the scrubbing operation of the memory module;
generating a scrub map summary based upon the scrub error map analyzed;
creating an error history map by adding the scrub map summary generated;
analyzing the error history map created and tracking a chip location for each memory chip of the memory module including errors; and
determining a scrubbing algorithm of the memory module based on the analyzed error history map.

17. The computer program product of claim 16, wherein the method further comprises:
dynamically updating contents of the error history map while performing a scrubbing operation of the memory module.

18. The computer program product of claim 16, wherein the method further comprises:
generating another scrub map summary when the memory module is replaced with another memory module and re-generating the error history map based on the other memory module.

19. The computer program product of claim 16, wherein the method further comprises:
analyzing the error history map created and skipping a scrubbing operation of a memory module based upon information corresponding to the memory module in the error history map.

20. The computer program product of claim 16, wherein generating a scrub map summary based upon each scrub error map comprises:
generating the scrub map summary based upon a predetermined number of scrub error maps corresponding to a predetermined number of scrubbing operations of the memory module performed over a specified time period.

* * * * *